US012433792B2

(12) United States Patent
Becker et al.

(10) Patent No.: US 12,433,792 B2
(45) Date of Patent: Oct. 7, 2025

(54) SMART WELDING HELMETS WITH ARC TIME TRACKING VERIFICATION AND LENS MAINTENANCE DETECTION

(71) Applicant: Illinois Tool Works Inc., Glenview, IL (US)

(72) Inventors: William Joshua Becker, Manitowoc, WI (US); James Francis Rappl, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 856 days.

(21) Appl. No.: 17/539,617

(22) Filed: Dec. 1, 2021

(65) Prior Publication Data

US 2022/0183889 A1 Jun. 16, 2022

Related U.S. Application Data

(60) Provisional application No. 63/125,097, filed on Dec. 14, 2020.

(51) Int. Cl.
*A61F 9/06* (2006.01)
*B23K 9/095* (2006.01)
*B23K 9/32* (2006.01)

(52) U.S. Cl.
CPC ............ *A61F 9/061* (2013.01); *B23K 9/0953* (2013.01); *B23K 9/0956* (2013.01); *B23K 9/322* (2013.01)

(58) Field of Classification Search
CPC .... B23K 9/322; B23K 9/0953; B23K 9/0956; B23K 9/061; B23K 9/06
See application file for complete search history.

(56) References Cited

U.S. PATENT DOCUMENTS

| 4,021,840 A | 5/1977 | Ellsworth |
| 4,577,796 A | 3/1986 | Powers |

(Continued)

FOREIGN PATENT DOCUMENTS

| BE | 835944 | 3/1976 |
| CA | 2725719 A1 | 6/2012 |

(Continued)

OTHER PUBLICATIONS

European Patent Office, Extended European Search Report, Application No. 21185906, mailed Dec. 23, 2021.

(Continued)

*Primary Examiner* — Thien S Tran
(74) *Attorney, Agent, or Firm* — McAndrews, Held & Malloy, Ltd.

(57) ABSTRACT

Described herein are examples of smart welding helmets with arc time tracking verification and lens maintenance detection. In some examples, the arc time tracking verification checks whether certain conditions are satisfied before tracking the arc time. This may make arc time tracking more reliable by preventing tracking during certain false positive arc detection scenarios. In some examples, the lens maintenance detection notifies an operator to clean and/or replace their lens when the lens becomes substantially occluded (e.g., due to weld spatter) and/or has been in use for a certain amount of time (and/or arc time). This may assist operators who become too engrossed in their work to notice the gradual diminishment in visibility that can be caused by slow build up of weld spatter, debris, and/or other particulates on the cover lens.

20 Claims, 7 Drawing Sheets

(56) References Cited

U.S. PATENT DOCUMENTS

| | | |
|---|---|---|
| 4,641,292 A | 2/1987 | Tunnell |
| 4,733,051 A | 3/1988 | Nadeau |
| 4,776,323 A | 10/1988 | Spector |
| 4,812,614 A | 3/1989 | Wang |
| 5,572,102 A | 11/1996 | Goodfellow |
| 5,796,341 A | 8/1998 | Stratiotis |
| 5,923,555 A | 7/1999 | Bailey |
| 5,932,123 A | 8/1999 | Marhofer |
| 5,978,090 A | 11/1999 | Burri |
| 6,103,994 A | 8/2000 | Decoster et al. |
| 6,209,144 B1 | 4/2001 | Carter |
| 6,242,711 B1 | 6/2001 | Cooper |
| 6,271,500 B1 | 8/2001 | Hirayama |
| 6,337,458 B1 | 1/2002 | Lepeltier |
| 6,388,422 B1 | 5/2002 | Lew |
| 6,476,581 B2 | 11/2002 | Lew |
| 6,516,289 B2 | 2/2003 | David |
| 6,624,388 B1 | 9/2003 | Blankenship et al. |
| 6,842,722 B2 | 1/2005 | David |
| 7,178,932 B1 | 2/2007 | Buckman |
| 7,457,724 B2 | 11/2008 | Vock |
| 7,534,005 B1 | 5/2009 | Buckman |
| 7,559,902 B2 | 7/2009 | Ting |
| 7,698,101 B2 | 4/2010 | Alten |
| 7,808,385 B2 | 10/2010 | Zheng |
| 7,848,860 B2 | 12/2010 | Saposnik |
| 7,926,118 B2 | 4/2011 | Becker |
| 7,962,967 B2 | 6/2011 | Becker |
| 8,099,258 B2 | 1/2012 | Alten |
| 8,274,013 B2 | 9/2012 | Wallace |
| 8,316,462 B2 | 11/2012 | Becker et al. |
| 8,502,866 B2 | 8/2013 | Becker |
| 8,569,655 B2 | 10/2013 | Cole |
| 8,599,323 B2 | 12/2013 | Chen |
| 8,605,008 B1 | 12/2013 | Prest |
| 8,680,434 B2 | 3/2014 | Stoger et al. |
| 8,915,740 B2 | 12/2014 | Zboray |
| 8,957,835 B2 | 2/2015 | Hoellwarth |
| 8,990,963 B2 | 3/2015 | Matthews et al. |
| 8,992,226 B1 | 3/2015 | Leach |
| RE45,677 E * | 9/2015 | Steinemann ............... G01J 1/20 |
| 9,566,192 B2 | 2/2017 | Becker et al. |
| 10,610,708 B2 | 4/2020 | Awiszus et al. |
| 2001/0045639 A1 | 11/2001 | Hanamura |
| 2002/0056708 A1 | 5/2002 | Moriguchi |
| 2002/0180695 A1 | 12/2002 | Lawrence |
| 2005/0233859 A1 | 10/2005 | Takai |
| 2007/0102479 A1 | 5/2007 | Kan |
| 2007/0182709 A1 | 8/2007 | Brush |
| 2007/0187378 A1 | 8/2007 | Karakas |
| 2007/0261153 A1 | 11/2007 | Wise |
| 2008/0038702 A1 | 2/2008 | Choquet |
| 2008/0314887 A1 | 12/2008 | Stoger |
| 2008/0318679 A1 | 12/2008 | Tran |
| 2009/0057286 A1 | 3/2009 | Ihara |
| 2009/0231423 A1 | 9/2009 | Becker et al. |
| 2009/0276930 A1 | 11/2009 | Becker |
| 2009/0298024 A1 | 12/2009 | Batzler |
| 2010/0035688 A1 | 2/2010 | Picunko |
| 2010/0154255 A1 | 6/2010 | Robinson |
| 2010/0223706 A1 | 9/2010 | Becker et al. |
| 2011/0117527 A1 | 5/2011 | Conrardy |
| 2011/0220619 A1 | 9/2011 | Mehn |
| 2011/0316516 A1 | 12/2011 | Schiefermuller |
| 2012/0012561 A1 | 1/2012 | Wiryadinata |
| 2012/0050688 A1 | 3/2012 | Wu |
| 2012/0057240 A1 | 3/2012 | Sundell |
| 2012/0085741 A1 | 4/2012 | Holverson et al. |
| 2013/0081293 A1 | 4/2013 | Delin |
| 2013/0112673 A1 | 5/2013 | Petrilla et al. |
| 2013/0206740 A1 | 8/2013 | Pfeifer |
| 2013/0206741 A1 | 8/2013 | Pfeifer et al. |
| 2013/0208569 A1 | 8/2013 | Pfeifer |
| 2013/0215281 A1 | 8/2013 | Hobby |
| 2013/0291271 A1 * | 11/2013 | Becker ................... G06F 3/012 2/8.2 |
| 2014/0059730 A1 | 3/2014 | Kim |
| 2014/0069900 A1 | 3/2014 | Becker |
| 2014/0134579 A1 | 5/2014 | Becker |
| 2014/0134580 A1 | 5/2014 | Becker |
| 2014/0185282 A1 | 7/2014 | Hsu |
| 2014/0205976 A1 | 7/2014 | Peters |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2015/0009316 A1 | 1/2015 | Baldwin |
| 2015/0072323 A1 | 3/2015 | Postlethwaite |
| 2015/0125836 A1 | 5/2015 | Daniel |
| 2015/0154884 A1 | 6/2015 | Salsich |
| 2015/0248845 A1 | 9/2015 | Postlethwaite |
| 2015/0352653 A1 | 12/2015 | Albrecht |
| 2016/0022496 A1 | 1/2016 | Dekeuster et al. |
| 2016/0089751 A1 | 3/2016 | Batzler et al. |
| 2017/0143549 A1 | 5/2017 | Becker et al. |
| 2018/0271709 A1 | 9/2018 | Currie |
| 2018/0360663 A1 | 12/2018 | Hsieh |
| 2020/0085132 A1 | 3/2020 | Segura et al. |

FOREIGN PATENT DOCUMENTS

| | | |
|---|---|---|
| CN | 2176193 | 9/1994 |
| CN | 1093961 | 10/1994 |
| CN | 1130116 | 9/1996 |
| CN | 1266391 | 9/2000 |
| CN | 1633345 | 6/2005 |
| CN | 1665634 | 9/2005 |
| CN | 1780712 | 5/2006 |
| CN | 101068648 | 11/2007 |
| CN | 101108439 | 1/2008 |
| CN | 101352778 | 1/2009 |
| CN | 101422839 | 5/2009 |
| CN | 201249320 | 6/2009 |
| CN | 102341950 | 2/2012 |
| CN | 102971106 | 3/2013 |
| CN | 103128425 | 6/2013 |
| CN | 106510942 A * | 3/2017 |
| DE | 102005032136 | 1/2007 |
| EP | 2022592 A1 | 2/2009 |
| EP | 2082656 A1 | 7/2009 |
| ES | 336308 | 1/1968 |
| JP | 10305366 | 11/1998 |
| JP | 2016059094 | 4/2016 |
| KR | 950003258 | 4/1995 |
| KR | 101237675 | 8/2012 |
| WO | 9934950 | 7/1999 |
| WO | 2005084867 | 9/2005 |
| WO | 2006042572 A1 | 4/2006 |
| WO | 2007009131 | 1/2007 |
| WO | 2008101379 A1 | 8/2008 |
| WO | 2009137379 A1 | 11/2009 |
| WO | 2016075518 | 5/2016 |
| WO | 2019051349 | 3/2019 |

OTHER PUBLICATIONS

Canada Patent Office, Office Action, Application No. 3,123,077, mailed Jul. 25, 2024, 4 pages.
International Search Report from PCT application No. PCT/US2015/041044, dated Nov. 16, 2015, 15 pgs.
"CyberGlove Data Glove: User Guide," CyberGlove Systems LLC, Dec. 2007, http://www.cyberglovesystems.com/support/; http://static1.squarespace.com/static/559c381ee4b0ff7423b6b6a4/t/574f4b392eeb81ec9526760f/1464814396021/CyberGloveUserGuid_wired_rev10.pdf.
"CyberGlove II Wireless Data Glove: User Guide," CyberGlove Systems LLC, Jul. 2008, http://www.cyberglovesystems.com/support/; https://static1.squarespace.com/static/559c381ee4b0ff7123b6b6a4/t/574f4c35b654f98f724d1927/1464814655198/CyberGloveII_UserGuide_2009_0.pdf.

(56) References Cited

OTHER PUBLICATIONS

Li, Larry, Time-of-Flight Camera—An Introduction, Technical White Paper, SLOA190B—Jan. 2014, revised May 2014 (10 pages).
Heston, Tim, Lights, camera, lean-recording manufacturing efficiency, The Fabricator, Aug. 2010 (4 pages).
Wavelength Selective Switching, http://en.wikipedia.org/wiki/wavelength_selective_switching, Mar. 4, 2015 (5 pages).
Cavilux HF, Laser Light for High-Speed Imaging, See What You Have Missed (2 pages).
Cavilux Smart, Laser Light for Monitoring and High Speed Imaging, Welcome to the Invisible World (2 pages).
Windows 10 to Get 'Holographic' Headset and Cortana, BBC News, www.bbc.com/news/technology-30924022, Feb. 26, 2015 (4 pages).
Daqri Smart Helmet, The World's First Wearable Human Machine Interface, Brochure (9 pages).
Intelligenter Schweißbrenner, Intelligent Welding Torch, IP Bewertungs AG (IPB) (12 pages).
Intelligent Robotic Arc Sensing, Lincoln Electric, Oct. 20, 2014, http://www.lincolnelectric.com/en-us/support/process-and-theory/pages/intelligent-robotic-detail.aspx (3 pages).
LiveArc Welding Performance Management System, a reality-based recruiting, screening and training solution, MillerWelds.com 2014 (4 pages).
Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_r obot_positioning_accuracy (19 pages).
Lutwak, Dr. Robert, Micro-Technology for Positioning, Navigation, and Timing Towards PNT Everywhere and Always Stanford PNT Symposium, Stanford, CA Oct. 29, 2014 (26 pages).
Lutwak, Dr. Robert, DARPA, Microsystems Tech. Office, Micro-Technology for Positioning, Navigation, and Timing Towards PNT Everywhere and Always, Feb. 2014 (4 pages).
Parnian, Neda et al., Integration of a Multi-Camera Vision System and Strapdown Inertial Naviation System (SDINS) with a Modified Kalman Filter, Sensors 2010,10, 5378-5394; doi: 10.3390/s100605378 (17 pages).
Pipe-Bug, Motorized & Manual Chain Driven Pipe Cutting Machines From Bug-0 Systems (4 pages).
Electronic speckle pattern interferometry Wikipedia, the free encyclopedia (4 pages), [retrieved Feb. 10, 2015].
Rivers, et al., Position-Correcting Tools for 2D Digital Fabrication (7 pages).
Kevin Dixon, et al., Gesture-based Programming for Robotic Arc Welding, Carnegie Mellon University, dated Dec. 6, 2002 (24 pages).
International Search Report and Written Opinion for PCT/US2016/013867, dated Apr. 28, 2016 (11 pages).
Handheld Welding Torch with Position Detection technology description, Sep. 21, 2011 (11 pages).
International Search Report for application No. PCT/US2011/043757 mailed Nov. 8, 2011.
Canadian Office Action Appln No. 2,831,295 dated Nov. 6, 2017 (4 pages).
Lincoln Electric, "Power Wave Manager user Manual", pp. 26-27, http://lincolnelectric.com/en-za/equipment/Documents/Power-WaveManager.pdf, Jan. 25, 2011.
Esab, "PEK Control panel," pp. 7-8, http://pdfmanuals.esab.com/private/Library/InstructionManuals/0460%20949%20174%20GB.pdf, 2009.
Canadian Office Action Appln No. 2,831,295 dated Sep. 19, 2018 (5 pages).
Int'l Search Report and Written Opinion Appln. No. PCT/US2019/051475 mailed Nov. 27, 2019 (11 pgs).
Fronius, Vizor Connect, retreived from https://www.fronius.com/en/welding-technology/products/accessories/personal-protective-equipment/automatic-protective-welding-helmets/vizor-connect/vizor-connect, retreived on Nov. 18, 2021, 5 pages.
Trafimet welding and cutting, T-Link System is the new technology granting total eye protection for the welding operator, retreived from http://www.trafimet.com/welding-systems/t-link-eye-protection-system-for-welders/, retreived on Nov. 18, 2021, 11 pages.
European Patent Office, Extended European Search Report, Application No. 21213550.3, mailed May 6, 2022, 7 pages.
European Patent Office, Office Action, Application No. 21213550.3-1122, dated May 14, 2025, 5 pages.

\* cited by examiner

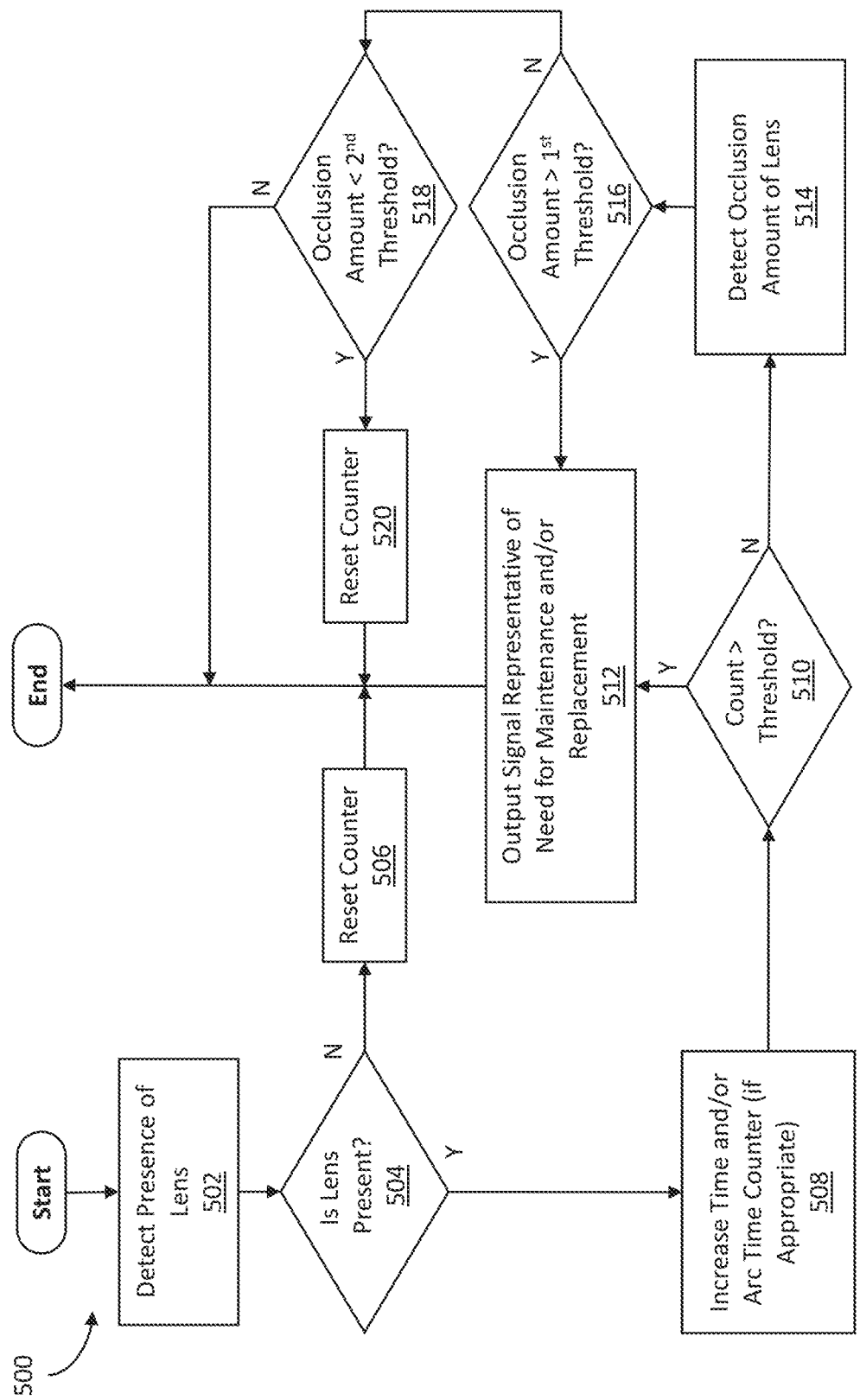

SMART WELDING HELMETS WITH ARC TIME TRACKING VERIFICATION AND LENS MAINTENANCE DETECTION

CROSS REFERENCE TO RELATED APPLICATIONS

This application claims the benefit of U.S. Provisional Patent Application No. 63/125,097, filed Dec. 14, 2020, and titled "Smart Welding Helmets with Arc Time Tracking Verification and Lens Maintenance Detection," the contents of which are hereby incorporated by reference in their entirety.

TECHNICAL FIELD

The present disclosure generally relates to smart welding helmets and, more particularly, to smart welding helmets with arc time tracking verification and lens maintenance detection.

BACKGROUND

Welding operators sometimes wear welding helmets during welding operations. Conventional welding helmets have a helmet shell to shield the head of the welding operator during welding operations. The helmet shell is also fitted with a see through cover lens to allow the welding operator to view the surrounding environment while wearing the welding helmet.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to smart welding helmets with arc time tracking verification and lens maintenance detection, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 5 is a flow diagram illustrating an example operation of a lens maintenance program, in accordance with aspects of this disclosure.

The figures are not necessarily to scale. Where appropriate, the same or similar reference numerals are used in the figures to refer to similar or identical elements.

DETAILED DESCRIPTION

Figure 1:
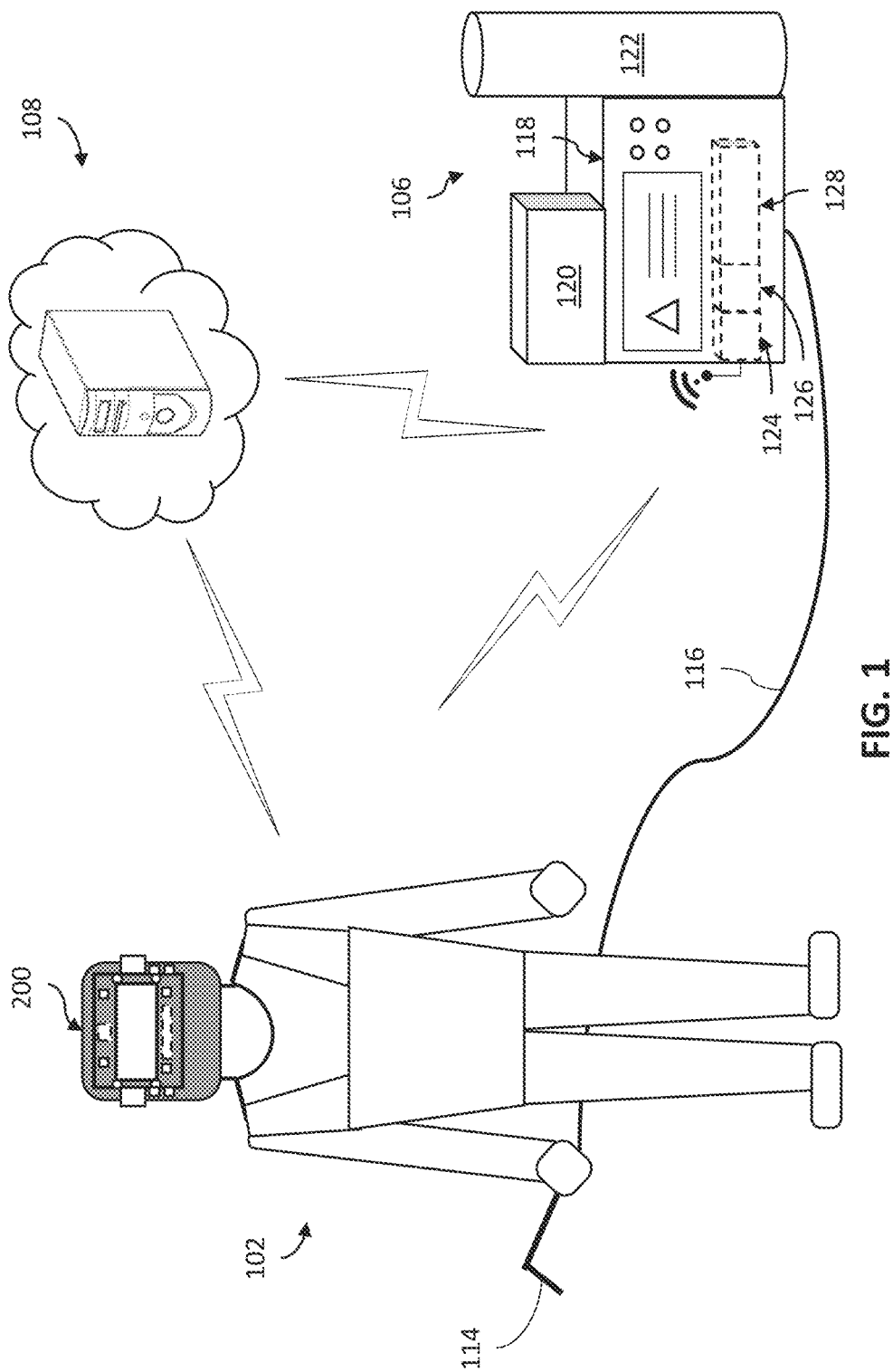
FIG. 1 shows an example of an operator wearing a smart welding helmet, in accordance with aspects of this disclosure.

Some examples of the present disclosure relate to smart welding helmets with arc time tracking verification and lens maintenance detection functions. Arc time (or arc on time) is a metric that is often tracked to help analyze, understand, and/or improve welding productivity and/or efficiency. In some examples, the arc time tracking verification function ensures certain conditions are satisfied before tracking arc on time. This may make arc time tracking more reliable by preventing tracking during certain false positive arc detection scenarios where, for example, the detected "arc" light is from ambient light or a different welding operation. In some examples, the lens maintenance detection function notifies an operator when it is time to clean and/or replace their cover lens. This may assist operators who become too engrossed in their work to notice the gradual diminishment in visibility that can be caused by the slow build up of weld spatter, debris, and/or other particulates on the cover lens.

Some examples of the present disclosure relate to a welding helmet, comprising: processing circuitry; and memory circuitry comprising machine readable instructions which, when executed, cause the processing circuitry to: determine whether an operator is performing a welding operation based on at least one of a measured temperature, a measured current, a measured voltage, a measured wire feed speed, a measured gas flow rate, a distance from the welding helmet to a light source, whether the welding helmet is mounted on a head of the operator, or whether the welding helmet is in an up or down orientation over a face of the operator, and track an arc time or darken a filter of the welding helmet in response to determining that the operator is performing the welding operation.

In some examples, the memory circuitry comprises machine readable instructions which, when executed, cause the processing circuitry to determine whether the operator is performing the welding operation based on the measured temperature, wherein determining whether the operator is performing the welding operation based on the measured temperature comprises: measuring a temperature of the welding helmet, determining whether the temperature is above a temperature threshold, and determining that the operator is performing the welding operation in response to determining that the temperature is above the temperature threshold. In some examples, the memory circuitry further comprises machine readable instructions which, when executed, cause the processing circuitry to: track the arc time while the filter of the welding helmet is darkened in response to determining that the operator is performing the welding operation. In some examples, the memory circuitry comprises machine readable instructions which, when executed, cause the processing circuitry to determine whether the operator is performing the welding operation based on the measured current, measured voltage, measured wire feed speed, or measured gas flow rate, wherein determining whether the operator is performing the welding operation based on the measured current, measured voltage, measured wire feed speed, or measured gas flow rate comprises: receiving an electrical current measurement, electrical voltage measurement, wire feed speed measurement, or gas flow rate measurement from a welding power supply, wire feeder, gas valve, welding tool, or sensor, determining whether the electrical current measurement, electrical voltage measurement, wire feed speed measurement, or gas flow rate measurement is above a threshold, and determining that the operator is performing the welding operation in response to determining that the electrical current measurement, electrical voltage measurement, wire feed speed measurement, or gas flow rate measurement is above the threshold.

In some examples, the memory circuitry comprises machine readable instructions which, when executed, cause the processing circuitry to track the arc time in response to determining that the operator is performing the welding operation. In some examples, the memory circuitry comprises machine readable instructions which, when executed, cause the processing circuitry to determine whether the operator is performing the welding operation based on the distance from the welding helmet to the light source, wherein determining whether the operator is performing the welding operation based on the distance from the welding helmet to the light source comprises: capturing a first image and a second image of the light source via a first image sensor and a second image sensor of the welding helmet, determining a distance between the welding helmet and the light source using the first image and the second image, determining whether the distance is less than a threshold distance, and determining that the operator is performing the welding operation in response to determining that the distance is less than the threshold distance. In some examples, the memory circuitry comprises machine readable instructions which, when executed, cause the processing circuitry to determine whether the operator is performing the welding operation based on whether the welding helmet is mounted on a head of an operator, wherein determining whether the operator is performing the welding operation based on whether the welding helmet is mounted on a head of an operator comprises: determining whether a temperature measured by a temperature sensor of the welding helmet exceeds a temperature threshold, determining whether a switch sensor of the welding helmet has been activated, determining whether a capacitive sensor of the welding helmet detects skin contact, determining whether a carbon dioxide sensor of the welding helmet detects a carbon dioxide level above a CO2 threshold, determining whether an oxygen sensor of the welding helmet detects an oxygen level below an oxygen threshold, determining whether an accelerometer has detected movement within a past threshold time period, or determining whether an optical sensor detects an optical signal transmitted across a space that would be filled by the head of the operator if the welding helmet was mounted on the head of the operator, and determining that the operator is performing the welding operation in response to determining that the temperature exceeds the temperature threshold, the switch sensor has been activated, the capacitive sensor detects skin contact, the carbon dioxide sensor detects the carbon dioxide level above the CO2 threshold, the oxygen sensor detects the oxygen level below the oxygen threshold, the accelerometer has detected movement within the past threshold time period, or the optical sensor detects the optical signal.

In some examples, the memory circuitry comprises machine readable instructions which, when executed, cause the processing circuitry to determine whether the operator is performing the welding operation based on whether the welding helmet is in an up or down orientation over a face of the operator, wherein determining whether the operator is performing the welding operation based on whether the welding helmet is in an up or down orientation over a face of the operator comprises: determining whether a switch sensor of the welding helmet has been activated, determining whether a carbon dioxide sensor of the welding helmet detects a carbon dioxide level above a CO2 threshold, determining whether an oxygen sensor of the welding helmet detects an oxygen level below an oxygen threshold, determining whether a potentiometer or encoder sensor indicates the welding helmet is in the up or down orientation, determining whether relative first and second force vectors of first and second accelerometers of the welding helmet indicate that the welding helmet is in the up or down orientation, or determining whether an optical sensor detects an optical signal transmitted across a space that would be filled by the head of the operator if the welding helmet was in a down orientation, and determining that the operator is performing the welding operation in response to determining that the switch sensor has been activated, the carbon dioxide level is above the CO2 threshold, the oxygen level is below the oxygen threshold, the potentiometer or encoder sensor indicates the welding helmet is in the down orientation, the first and second force vectors of the first and second accelerometers indicate that the welding helmet is in the down orientation, or the optical sensor does not detect the optical signal. In some examples, the memory circuitry further comprises machine readable instructions which, when executed, cause the processing circuitry to: track the arc time in response to determining that the operator is performing the welding operation, and associate the arc time with a job being worked by the operator. In some examples, the memory circuitry further comprises machine readable instructions which, when executed, cause the processing circuitry to: track the arc time in response to determining that the operator is performing the welding operation, and associate the arc time with a welding procedure specification (WPS) being used by the operator.

Some examples of the present disclosure relate to a welding helmet, comprising: a lens; a sensor configured to measure an occlusion amount of the lens or detect a presence of the lens, the sensor configured to output a sensor signal indicative of the occlusion amount or the presence of the lens; and control circuitry configured to: determine whether maintenance or replacement of the lens is needed based on the sensor signal, and in response to determining maintenance or replacement of the lens is needed, output a notification.

In some examples, the lens is a cover lens of a helmet shell or a camera lens of a camera. In some examples, the sensor comprises an optical sensor configured to detect a light after the light has passed through the lens, the sensor signal being indicative of an amount of the light detected by the optical sensor, and the control circuitry being configured to determine whether maintenance or replacement of the lens is needed based on whether the amount of the light detected by the optical sensor is below a threshold. In some examples, the welding helmet further comprises a light source configured to project the light through the lens.

In some examples, the sensor is configured to detect the presence of the lens, the sensor comprising an optical sensor, a proximity sensor, a near field communication (NFC) device configured to communicate with a complementary NFC device of the lens, or a mechanical switch that is triggered when the lens in present or absent. In some examples, the control circuitry is configured to monitor an amount of time since the lens underwent maintenance or replacement via a counter while the sensor detects the presence of the lens, and reset the counter when the sensor does not detect the presence of the lens. In some examples, the control circuitry is configured to determine maintenance or replacement of the lens is needed when a value of the counter exceeds a threshold.

In some examples, the amount of time comprises the amount of time that a welding arc is present. In some examples, the control circuitry is configured to determine the welding arc is present only when a measured temperature of the welding helmet, a measured current, a measured voltage, a measured wire feed speed, a measured gas flow rate, or a distance from the welding helmet to a light source exceed a threshold. In some examples, the control circuitry is configured to determine the welding arc is present only when the control circuitry determines that the welding helmet is mounted on a head of an operator, or the welding helmet is in a down orientation over a face of the operator.

FIG. 1 shows an example of a welding operator 102 wearing a smart welding helmet 200. As shown, the smart welding helmet 200 is in communication with welding equipment 106 and one or more remote servers 108. While referred to as remote, in some examples one or more of the remote servers 108 may be nearby servers and/or (e.g., desktop, laptop, etc.) computers. In some examples, the smart welding helmet 200 may also be in communication with other welding devices, such as, for example, a welding torch 114 connected to the welding equipment 106 via cable 116 and/or one or more sensors connected to the welding equipment 106, welding torch 114, and/or cable 116. In some examples, some or all of the communication may be through one or more cellular communication networks, local area networks, and/or wide area networks (e.g., the Internet).

In the example of FIG. 1, the welding equipment 106 comprises a welding-type power supply 118, wire feeder 120, and gas supply 122. In some examples, the wire feeder 120 may be configured to feed wire to the welding torch 114. In some examples, the wire feeder 120 may include one or more sensors configured to measure the speed at which wire is fed to the welding torch 114. In some examples, the gas supply 122 may be configured to supply shielding gas to the welding torch 114. In some examples, the gas supply 122 (and/or welding-type power supply 118) may include a gas valve and/or gas regulator configured to control a flow rate of gas from the gas supply 122 to the welding torch 114, and/or one or more sensors configured to measure the flow rate.

In the example of FIG. 1, the power supply 118 includes communication circuitry 124, control circuitry 126, and power conversion circuitry 128 interconnected with one another. In some examples, the communication circuitry 124 may be configured for communication with the remote server(s) 108, welding torch 114, and/or the smart welding helmet 200. In some examples, the power conversion circuitry 128 may be configured to receive input power (e.g., from a generator, a battery, mains power, etc.) and convert the input power to welding-type output power, such as might be suitable for use by the welding torch 114 for welding-type operations, for example. In some examples, the control circuitry 126 may be configured to control operation of the communication circuitry 124, power conversion circuitry 128, wire feeder 120, and/or gas supply 122 (e.g. via one or more control signals). In some examples, the control circuitry 126 may control communications of the welding equipment 106 with the smart helmet 200. While shown as part of the power supply 118, in some examples, the wire feeder 120 and/or gas supply 122 may also, or alternatively, include communication circuitry 124 and/or control circuitry 126.

FIGS. 2a-2d show enlarged front and side depictions of the example smart welding helmet 200. As shown, the smart welding helmet 200 comprises a helmet shell 230 attached to a suspension 232. As shown, the suspension 232 comprises several straps and/or bands configured to wrap around the head of an operator 102. The straps are connected to one another and to the helmet shell 230 at least at two side attachment points on either side of the head of the operator 102. In some examples, the smart helmet 200 may be configured to rotate and/or pivot about the side attachment points to transition between raised and lowered positions.

Figure 2A:
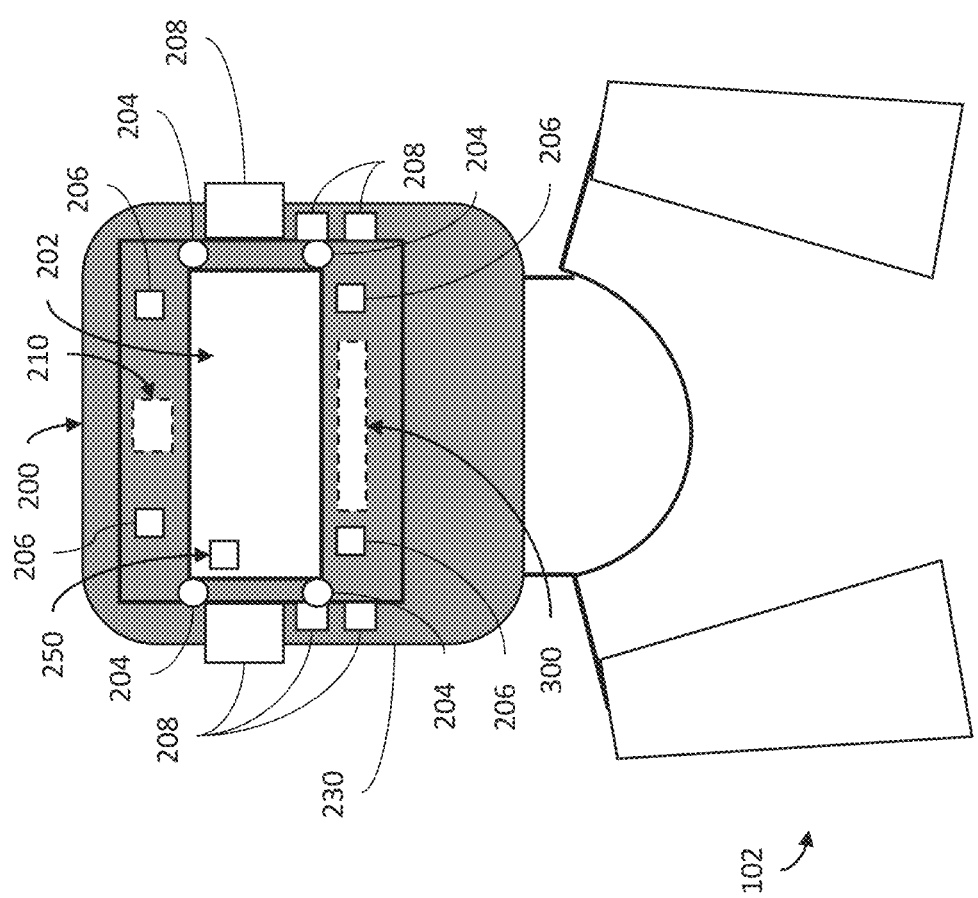
FIG. 2a shows an enlarged front view of the smart welding helmet of FIG. 1, in accordance with aspects of this disclosure.
Figure 2C:
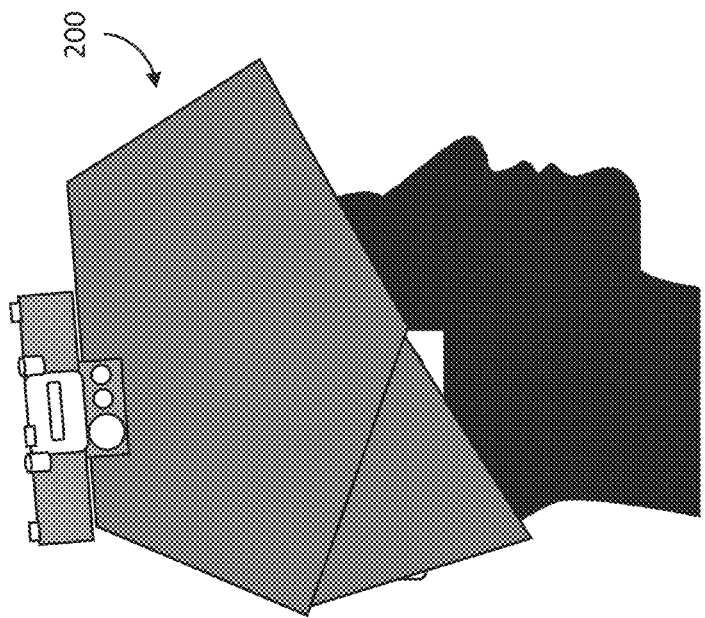
FIG. 2b-2d show side views of the example smart welding helmet of FIG. 1, in accordance with aspects of this disclosure.
Figure 2B:
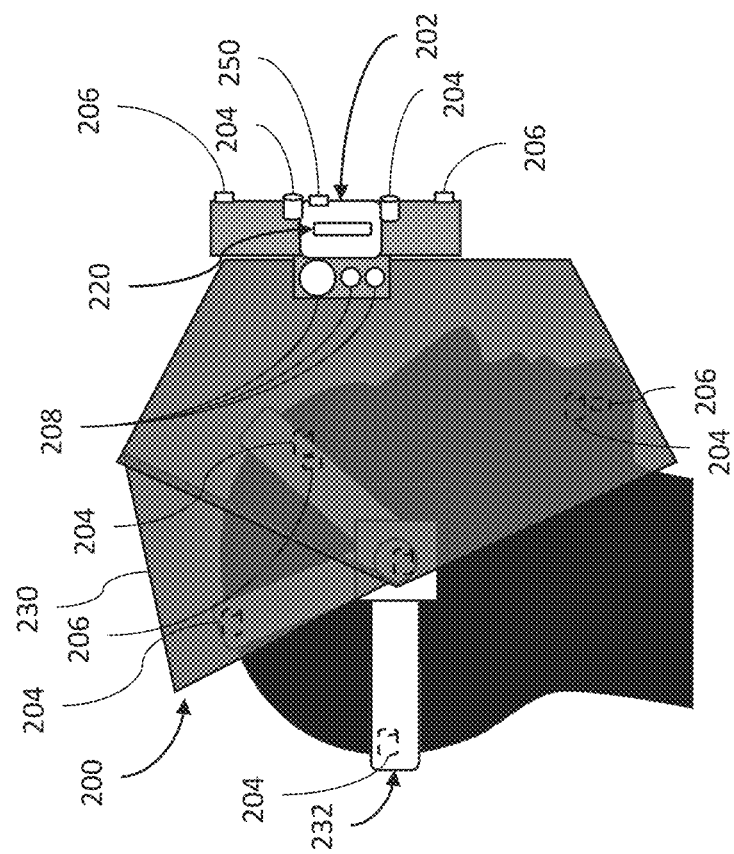

In the example of FIGS. 2a-2c, the smart helmet 200 includes a cover lens 202, several sensors 204, multiple lights 206, a plurality of control inputs 208 (e.g., knobs, buttons, levers, switches, touch screens, microphones, etc.), helmet circuitry 300 (e.g., to control the above components), and a power source 210 (e.g., to power the above components). While described as control inputs 208, in some examples, the control inputs 208 may also comprise output devices, such as, for example, audio output devices (e.g., speaker(s)) and/or haptic output devices. While shown as being retained on an external surface of the smart helmet 200 in the example of FIG. 2a-2d, in some examples, control inputs 208 (e.g., microphones) may also be retained on an internal surface of the smart helmet 200. As shown in FIG. 2b, sensors 204 and/or lights 206 may also be positioned within the helmet shell 230, retained by the suspension 132. While not shown in the example of FIG. 2b for the sake of clarity, in some examples the sensors 204 and/or lights 206 positioned within the helmet shell 230 and/or retained by the suspension 132 may be tethered and/or otherwise connected to the smart helmet 200. In some examples, one or more of the sensors 204 and/or lights 206 may only be powered and/or activated at specific times, for specific purposes, and/or when specifically needed, and/or otherwise left unpowered and/or deactivated by default, in order to conserve energy.

In some examples, one or more of the sensors 204 may comprise an optical sensor (e.g., a camera), an inertial measurement unit (IMU) (e.g., comprising an accelerometer and/or gyroscope), a photodiode sensor, a capacitive sensor, a near field communication (NFC) sensor, a radio frequency identification (RFID) sensor, a Bluetooth sensor, an infra-red (IR) sensor, an acoustic sensor, an induction sensor, a motion sensor, an opacity sensor, a proximity sensor, an inductive sensor, a magnet, a magnetic sensor, a GPS sensor, a heat sensor, a thermocouple, a thermistor, a photoelectric sensor, an ultrasonic sensor, an inclinometer, a force sensor, a piezoelectric sensor, a chemical sensor, an ozone sensor, a smoke sensor, a magnetometer, a carbon dioxide detector, a carbon monoxide detector, an oxygen sensor, a glucose sensor, an altimeter, an object detector, a marker detector, a laser rangefinder, a sonar, a heart rate sensor, a current sensor, a voltage sensor, a power sensor, a mechanical switch, a reed switch, a potentiometer, an (e.g., optical) encoder, and/or a gaze tracker. Further descriptions of applicable sensors 204 that may be used in and/or with the smart helmet 200 are described in U.S. Pat. No. 10,448,692, issued on Oct. 22, 2019, the entirety of which is hereby incorporated by reference.

In some examples, one or more optical sensors 204 may be configured to capture one or more images/videos of the surrounding environment. In some examples, those images/videos may be processed (e.g., by the helmet circuitry 300) to identify one or more light sources in the surrounding environment. In some examples, images from two or more different optical sensors 204 may be used to determine a relative distance of the one or more light sources from the smart helmet 200 (e.g., via triangulation, trilateration, and/or stereoscopic ranging techniques).

In some examples, one or more of the sensors 204 may be used to automatically identify an operator 102 wearing the smart helmet 200. For example, one or more of the sensors 204 may be configured to perform a retinal scan of the operator 102, scan a badge of the operator (e.g., via a camera, barcode scanner, optical scanner, NFC transceiver, other close proximity communication transceiver, etc.), and/or otherwise automatically obtain identifying information of the operator 102. In some examples, the information obtained by the sensor(s) 204 may be compared to information stored in the smart helmet 200 and/or communicated to the remote server(s) 108 to identify the operator 102.

In some examples, one or more of the sensors 204 may be used to detect whether the helmet is being worn raised, lowered, or not at all. In some examples, one or more of the sensors 204 may be used to automatically detect the presence (and/or absence) of the cover lens 202 (and/or a lens of a camera sensor 204). In some examples, one or more of the sensors 204 may be used to automatically detect an occlusion amount of the cover lens 202 (and/or a lens of a camera sensor 204). In some examples, more or fewer sensors 204 than shown may be used.

Figure 2D:
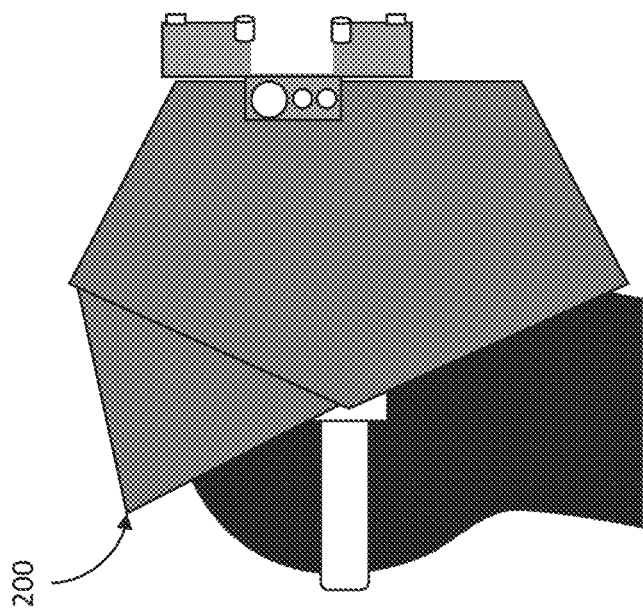

In the example of FIGS. 2a-2c, the cover lens 202 is positioned in the smart helmet 200 at approximately eye level. In some examples, the cover lens 202 may be (e.g., partially or fully) transparent and/or configured to allow an operator 102 to see through the cover lens 202 and view the surrounding environment. In some examples, the cover lens 202 may be periodically removed for maintenance (e.g., cleaning) and/or replacement to ensure that the operator 102 can continue to see through the cover lens 202. FIG. 2d shows an example of the smart helmet 200 with the cover lens 202 removed.

In the example of FIGS. 2b-2c, the cover lens 202 includes an auto-darkening filter (ADF) 220. In some examples, the ADF 220 comprises a lens with a transparency that varies based on a signal provided by a photodiode sensor 204 (and/or a sensor of the ADF 220) configured to detect light above a threshold intensity (e.g., the light of a welding arc). In some examples, the signal may instead be provided by the smart module circuitry 300 (e.g., after interpreting data from the photodiode sensor 204). In this manner, when a welding arc is present, the cover lens 202 may be darkened to protect the eyes of the operator 102, and when the welding arc is not present the cover lens 202 may be lightened so that the operator 102 can see the surrounding environment. In some examples, settings of the ADF 220 may be controlled and/or presented to the operator 102 via control inputs/outputs 208. In some examples, the state of the ADF 220 (e.g., darkened or undarkened) may be used to track arc on time so that the operator 102 and/or administrators know when, how long, and/or how often a welding arc is present and/or the operator 102 is welding. In some examples, the state of the ADF 220 (e.g., darkened or undarkened) may be controlled based on factors other than light intensity.

In the example of FIGS. 2b-2c, the cover lens 202 also includes a lens device 250. In some examples, the lens device 250 may be a reflective device and/or surface. In some examples, the lens device 250 may be a tag, such as a near field communication (NFC), radio frequency identification (RFID), and/or Bluetooth tag. In some examples, the lens device 250 may be a magnet. In some examples, the lens device 250 may be a light 206. In some examples, the lens device 250 may be a sensor 204.

While shown as part of the cover lens 202 in the example of FIGS. 2a-2c, in some examples, the lens device 250 may instead be attached to the helmet shell 230 (e.g., via an armature and/or linkage) and extend down over the cover lens 202. While shown as being on the outside (and/or external surface) of the smart helmet 200, cover lens 202, and/or helmet shell 230 in the example of FIGS. 2a-2c, in some examples, the lens device 250 may instead be on the inside (and/or internal surface) of the smart helmet 200, cover lens 202, and/or helmet shell 230. While described as being part of the cover lens 202, in some examples, a lens device 250 may also be part of the lens of a camera sensor 204. In some examples, one or more other sensors 104 may also be integrated with the cover lens 202 and/or ADF.

In the examples of FIGS. 2a-2c, several sensors 204 are positioned proximate the cover lens 202. In some examples, one or more of the sensors 204 may be configured to detect the presence or absence of the cover lens 202. For example, the lens device 250 may comprise an NFC, RFID, Bluetooth, and/or other type of tag, and the sensor(s) 204 may be configured to detect, read, and/or communicate with the tag when the cover lens 202 is present. As another example, the lens device 250 may be a magnet, and one or more sensors 204 may comprise reed switches and/or magnetic sensors configured to activate in the presence of the magnetic field when the cover lens 202 is present. As another example, the one or more sensors 204 may comprise one or more mechanical switches positioned such that they are activated when the cover lens 202 is present and deactivated when the cover lens 202 is absent (or vice versa).

In some examples, the cover lens 202 may include one or more display screens. In some examples, a display screen may be part of the entire cover lens 202. In some examples, a display screen may be part of only a portion of the cover lens 202, so as to be visible to only one eye and/or positioned over a portion (e.g., top/bottom/left/right) of one or both eyes. In some examples, a display screen may be a near-eye display. In some examples, the display screen(s) may be semi-transparent and/or configured to overlay information (e.g., virtual/simulated/holographic objects, guidance, messages, parameters, etc.) onto at least part of cover lens 202. In some examples, the display screen(s) may be considered part of the control inputs/outputs 208.

In some examples the display screen(s) may be configured to display information about certain aspects of the smart helmet 200. For example, the display screen(s) may display settings of the ADF 220, recently tracked arc time (e.g., for the current/previous day, current/previous weld, etc.), information about the cover lens 202, and/or other information. In some examples, the display screen(s) may display information received from the remote server(s) 108, such as, for example, one or more jobs and/or welding procedure specifications (WPSs) associated with the smart helmet 200 and/or operator 102, and/or comparative information (e.g., arc time as compared to other days/welds/jobs/operators, etc.). In some examples, this information may be output via other control inputs/outputs 208.

In the example of FIGS. 2a-2d, the smart helmet 200 includes several lights 206. In some examples, the lights 206 may be used to illuminate the surrounding environment so that the operator 102 can better see. In some examples, one or more lights 206 may be used to help detect the presence or absence of the cover lens 202, and/or detect an occlusion amount of the cover lens 202.

For example, one or more lights 206 retained within the smart helmet 200 may direct a focused beam of light through the cover lens 202, and some or all of the light may be detected by a sensor 204 (e.g., the lens device 250) on the opposite side of the cover lens 202. In such an example, the amount of light detected may be indicative of how occluded (e.g., dirty) the cover lens 202 is, and/or the degree of visibility through the cover lens 202. Thereby, detection of a low amount of light would indicate high occlusion and/or low visibility, and detection of a high amount would indicate low occlusion and/or high visibility. In some examples, ambient light (and/or arc light) may be used instead of light from a light 206. In some examples, the sensor 204 may be a camera sensor 204 that captures an (e.g., backlit) image through the cover lens, and that image may be processed to determine an amount of light visible through (and/or an occlusion amount of) the cover lens 202.

As another example, one or more lights 206 retained within the smart helmet 200 may direct a focused beam of light through the cover lens 202, and some or all of the light may be reflected by the lens device 250 when the cover lens 202 is present. In such an example, one or more sensors 204 (also positioned within the smart helmet 200) may detect the reflected light when the cover lens 202 is present, and not detect the reflected light when the cover lens 202 is absent. As another example, one or more lights 206 may be positioned on one side of the helmet shell 230 such that a focused light beam is directed to the other side of the helmet shell 230 across a space that is occupied by the cover lens 202 when the cover lens 202 is present. In such an example, one or more sensors 204 positioned on the other side of the helmet shell 230 across from the light(s) 206 may detect the focused light when the cover lens 202 is absent. However, the cover lens 202 may interrupt the light when present, thereby preventing detection by the sensor(s) 204. In some examples, the focused light in any of the examples discussed above may be IR light, ultraviolet light, and/or another type of light outside the visible wavelengths and/or normal convention. This may make the light easier to detect, less likely to suffer interference from other nearby lighting, and/or less likely to distract the operator 102. While described in terms of the cover lens 202, in some examples, the above examples may also be applied to a lens of a camera sensor 204.

Figure 3:
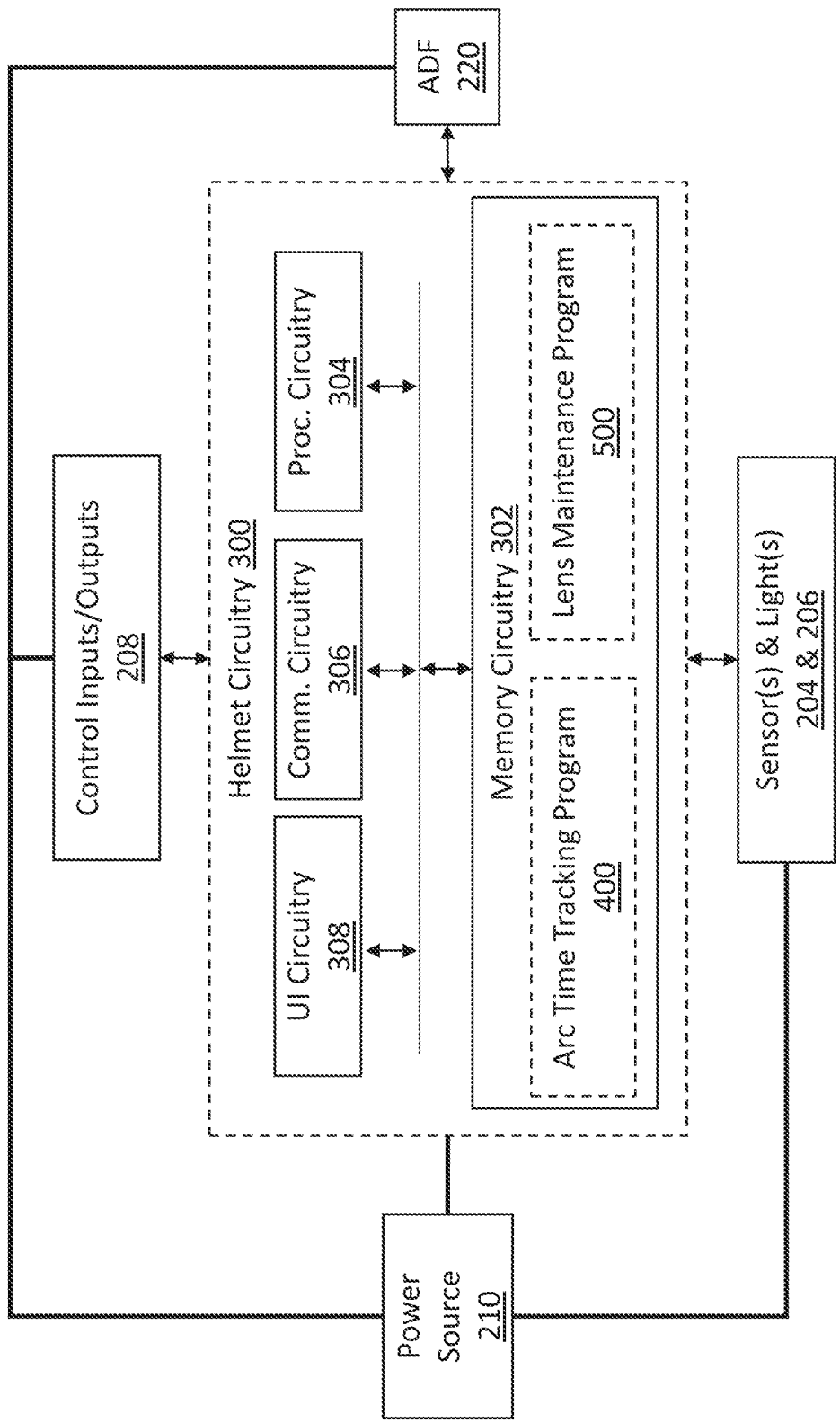
FIG. 3 is a block diagram showing example electrical components of the smart helmet of FIG. 1, in accordance with aspects of this disclosure.

FIG. 3 is a block diagram showing example components of the helmet circuitry 300 of the smart helmet 200, as well as interconnections between the components of the helmet circuitry 300 and other components of the smart helmet 200. As shown, the helmet circuitry 300 includes memory circuitry 302, processing circuitry 304, communication circuitry 306, and user interface (UI) circuitry 308, interconnected with one another via a common electrical bus. The helmet circuitry 300 is also in electrical communication with the control inputs/outputs 208, the sensor(s) 204, the light(s) 206, and the ADF 220.

In the example of FIG. 3, the helmet circuitry 300, control inputs/outputs 208, sensor(s) 204, light(s) 206, and ADF 220 are powered by a power source 210 (e.g., a battery, power cell, etc.). While the power source 210, sensor(s) 204, and light(s) 206 are shown as separate from the helmet circuitry 300 in the example of FIG. 3, in some examples, the power source 210 and/or some or all of the sensors 204 and/or lights 206 may be part of the helmet circuitry 300. In some examples, one or more of the sensors 204 may be configured to detect a remaining power (and/or voltage) level of the power source 210, and/or a current output power (and/or current/voltage) of the power source 210. In some examples, the power source 210 may be configured to connect to and/or receive power from an external source, either to directly power the smart helmet 200 or to recharge the power source 210 (e.g., via wired or wireless recharging).

In some examples, the UI circuitry 308 may be coupled to the control inputs 208 (and/or certain mechanical and/or electromechanical aspects of the control inputs 208). In some examples, the UI circuitry 308 may comprise one or more drivers for the control inputs 208. In some examples, the UI circuitry 308 may be configured to generate one or more signals representative of input received via the control inputs 208. In some examples, the UI circuitry 308 may also be configured to generate one or more outputs (e.g., via the via the control inputs 208) in response to one or more signals (e.g., received via the bus).

In some examples, the communication circuitry 306 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 306 may be configured to facilitate communication via one or more wired media and/or protocols (e.g., Ethernet cable(s), universal serial bus cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, Zigbee, HART, LTE, Z-Wave, WirelessHD, WiGig, etc.). In some examples, the communication circuitry 306 may be coupled to one or more antennas to facilitate wireless communication.

In some examples, the communication circuitry 306 may be configured to facilitate communications between the smart helmet 200 and other devices internal to, and/or external of, the smart helmet 200. For example, the communication circuitry 306 of the smart helmet 200 may facilitate communications between the smart helmet 200 and the remote server(s) 108, the welding equipment 106, and/or other devices. In some examples, the communication circuitry 306 may receive one or more signals (e.g., from the welding equipment 106, sensor(s) 204, remote server(s) 108, ADF 220, etc.) decode the signal(s), and provide the decoded data to the electrical bus. As another example, the communication circuitry 306 may receive one or more signals from the electrical bus (e.g., representative of one or more inputs from control inputs 208) encode the signal(s), and transmit the encoded signal(s) to an external device (e.g., the remote server(s) 108, the welding equipment 106, etc.).

In some examples, the processing circuitry 304 may comprise one or more processors, controllers, and/or graphical processing units (GPUs). In some examples, the processing circuitry 304 may comprise one or more drivers for the sensor(s) 204 and/or display screen(s). In some examples, the processing circuitry 304 may comprise counter circuitry and/or clock circuitry. In some examples, the processing circuitry 304 may be configured to execute machine readable instructions stored in the memory circuitry 302.

In the example of FIG. 3, the memory circuitry 302 includes (and/or stores) an arc time tracking program 400 and a lens maintenance program 500. While not shown in the example of FIG. 3, in some examples, the memory circuitry 302 may include (and/or store) machine readable instructions comprising counter and/or clock programs, in addition to the arc time tracking program 400 and lens maintenance program 500. In some examples, the arc time tracking program 400 and lens maintenance program 500 may comprise machine readable instructions configured for execution by the processing circuitry 304. In some examples, the arc time tracking program 400 and the lens maintenance program 500 may be implemented via discrete circuitry (e.g., of the processing circuitry 304) rather than, or in addition to, being part of (and/or stored in) the memory circuitry 302.

In some examples, the arc time tracking program 400 checks whether certain conditions are satisfied before tracking the arc time (and/or darkening the ADF 220). For example, the arc time tracking program 400 may check and/or verify that the temperature proximate to the smart helmet 200 is above a threshold (as might be expected during welding), or that the welding torch 114 and/or welding equipment 106 (and/or associated sensor(s)) detects wire being fed, gas flowing, and/or electrical current flowing. As another example, the arc time tracking program 400 may check and/or verify that the smart helmet 200 is actually being worn and/or worn down over the face of the operator 102. This additional verification may make arc time tracking more reliable by preventing tracking in certain known false positive arc detection situations, such as, for example, where the detected "arc" light is from ambient light, the detected "arc" light is from a different (and/or distant) welding operation, or the helmet 200 is sitting on a bench near a welding operation, rather than being worn by the operator 102.

Figure 4:
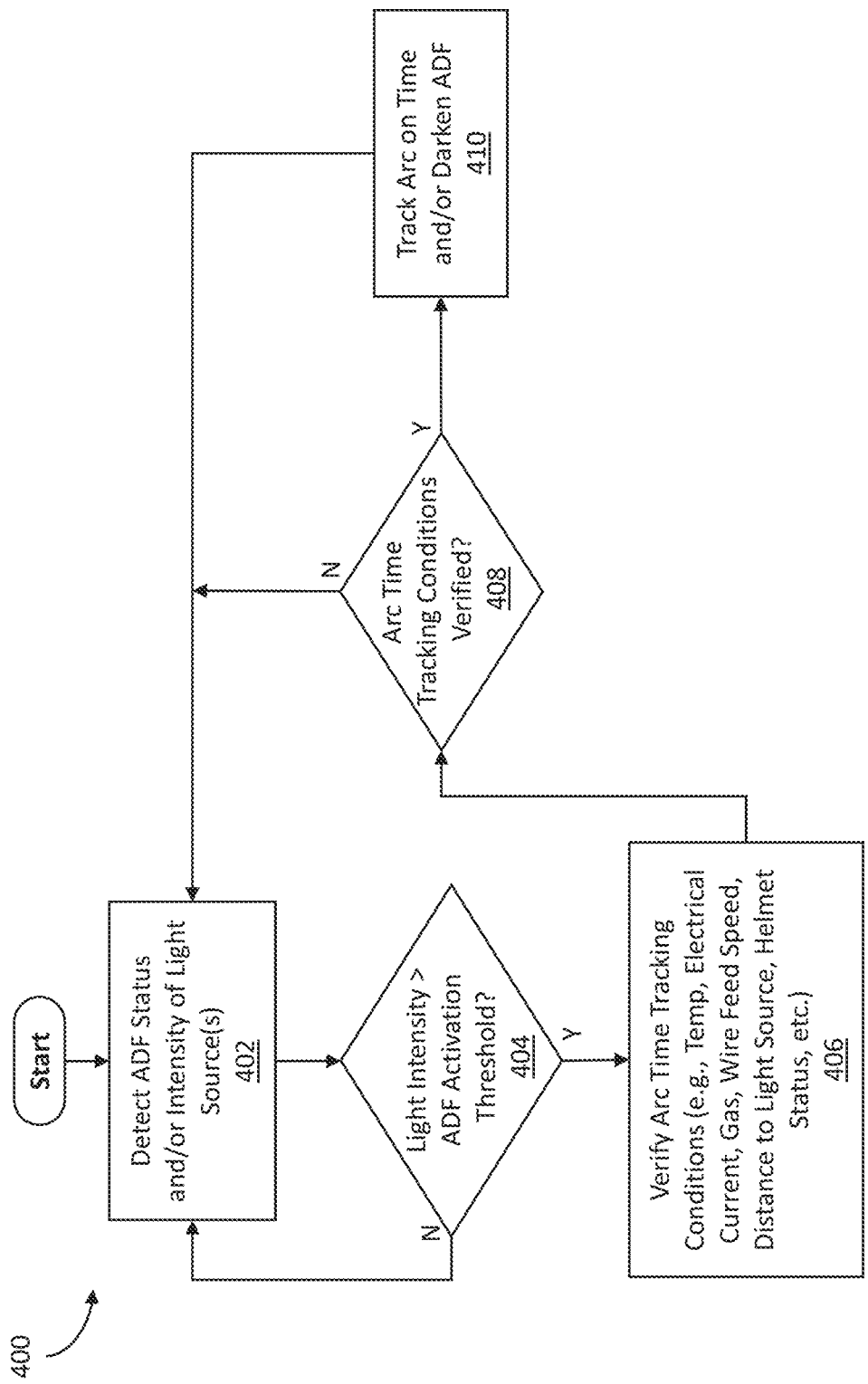
FIG. 4 is a flow diagram illustrating an example operation of an arc time tracking program, in accordance with aspects of this disclosure.

FIG. 4 is a flowchart illustrating operation of an example arc time tracking program 400. In the example of FIG. 4, the arc time tracking program 400 begins at block 402. At block 402, the arc time tracking program 400 detects a status of the ADF 220 (e.g., activated/darkened or deactivated/undarkened) and/or a light intensity detected by the sensor(s) 204 on the exterior of the smart helmet 200 (and/or sensor(s) of the ADF 220).

In the example of FIG. 4, the arc time tracking program 400 proceeds to block 404 after block 402. At block 404, the arc time tracking program 400 compares the detected light intensity to a threshold light intensity. In some examples, the threshold light intensity may be stored in memory circuitry 302 and/or set by the operator 102 (e.g., via control inputs/outputs 208). In some examples, the threshold light intensity may be the light intensity necessary to activate the ADF 220, a light intensity above which the human eye becomes uncomfortable, and/or a light intensity indicative of a welding arc. In some examples, the arc time tracking program 400 may simply determine whether the ADF 220 has been activated/darkened instead of (or in addition to) comparing the detected light intensity to a threshold light intensity.

In the example of FIG. 4, the arc time tracking program 400 returns to block 402 after block 404 if the detected light intensity is not greater than the threshold light intensity and/or the ADF 220 has not been activated/darkened. While shown as returning to block 402 in the example of FIG. 4, in some examples, the arc time tracking program 400 may end instead.

In the example of FIG. 4, the arc time tracking program 400 proceeds to block 406 after block 404 if the detected light intensity is greater than the threshold light intensity and/or the ADF 220 has been activated/darkened. At block 406, the arc time tracking program 400 verifies that certain conditions have been met for arc time tracking (and/or ADF 220 darkening). In some examples, the conditions may be correlated with a high probability of an ongoing welding operation. In some examples, verifying these conditions may make arc time tracking more reliable by preventing tracking in certain common false positive arc detection situations.

For example, the arc time tracking program 400 may verify that a temperature detected by the sensor(s) 204 on the outer surface of the smart helmet 200 is above a temperature threshold (e.g., stored in memory circuitry 302 and/or set via control inputs/outputs 208). In some examples, the temperature threshold may be a temperature above which the ambient temperature is unlikely to rise without some outside influence. Such a temperature check may verify that the smart helmet 200 is actually proximate a welding operation (which can give off significant heat).

As another example, the arc time tracking program 400 may verify that information received from the welding equipment 106 is indicative of a welding operation. For example, the arc time tracking program 400 may verify that electrical current, gas, and/or welding wire is being output by the welding equipment 106, such as occurs during an arc welding operation. In such an example, the smart welding helmet 200 may receive one or more electrical current, gas, and/or welding wire measurements from the welding equipment 106 and/or the welding torch 114 (and/or associated sensor(s)). In some examples, the arc time tracking program 400 may thereafter verify that at least a (e.g., non-zero) threshold amount of electrical current, voltage, wire, and/or gas is being output in order to verify that a welding operation is occurring.

In some examples, the arc time tracking program 400 may perform more precise verifications, such as by verifying that the electrical current, gas, and/or welding wire measurements fall within a particular threshold range (e.g., above a first threshold and below a second threshold), rather than just being above a threshold. For example, the measured voltage may be non-zero when the welding torch 114 is being activated (e.g., via trigger pull) even if welding is not yet occurring. In such an example, it may be more precise to verify that the voltage is within a particular range (e.g., approximately 1-40 volts, 10-40 volts, 1-30 volts, 10-30 volts, etc.) instead of just above a particular threshold. Of course, in some examples, it may be sufficient (even if slightly coarse) to simply verify that the voltage is above a threshold. In some examples, the threshold(s) may be stored in memory circuitry 302 and/or set via control inputs/outputs 208.

In some examples, the verification that a welding operation is occurring may be performed by the welding equipment 106, welding torch 114, and/or associated sensors rather than the smart welding helmet 200. In such an example, the smart welding helmet 200 may simply receive one or more welding signals (e.g., from the welding equipment 106, welding torch 114, and/or associated sensors) indicative of whether a welding operation is occurring. For example, the welding equipment 106, welding torch 114, and/or associated sensors may determine (and/or send one or more welding signals indicating) that a welding arc is present, the welding torch 114 is being activated, welding wire is being fed from the wire feeder 120 to the welding torch 114, and/or shielding gas is flowing from the gas supply 122 to the welding torch 114. In some examples, the smart welding helmet 200 may go through a pairing process with the welding equipment 106 and/or welding torch 114 to ensure that only measurements from appropriate welding equipment 106 and/or welding torches 114 are considered.

As another example, the arc time tracking program 400 may verify that the light source(s) detected by the ADF 220 and/or photodiode sensor(s) 204 (e.g., at blocks 402/404) is/are within a threshold distance from the smart helmet 200.

In such an example, images of the light source(s) captured by two or more different optical sensors 204 may be used to determine a relative distance of the light source(s) from the smart helmet 200 (e.g., via triangulation, trilateration, and/or stereoscopic ranging techniques). The distance(s) may be compared to a threshold distance (e.g., stored in memory circuitry 302 and/or set via control inputs/outputs 208) to verify that the light source is sufficiently close, thereby increasing the likelihood that the light source is a welding arc, as opposed to the sun or some other bright, but distant, light source.

As another example, the arc time tracking program 400 may verify that the smart welding helmet 200 is being worn on the head of the operator 102, such as would occur during a welding operation. In some examples, the arc time tracking program 400 may look at output(s) of the sensor(s) 204 to determine whether the welding helmet 200 is being worn on the head of the operator 102. For example, the arc time tracking program 400 may look at whether the (e.g., IMU) sensor(s) 204 have detected movement within a past threshold time period (e.g., stored in memory circuitry 302 and/or set via control inputs/outputs 208). In such an example, the arc time tracking program 400 may determine that the smart welding helmet 200 is not being worn if no movement has been detected within the threshold time period. This threshold time period may be large enough to account for natural periods of rest or immobility by an operator 102, and small enough to catch abnormally long periods of inactivity. Such a movement check may be a very simple (albeit coarse) way to verify that the smart helmet 200 is actually being worn by an operator 102.

As another example, a thermal sensor 204 (e.g., positioned in/on, and/or attached to, the suspension 232 of the smart helmet 200) may detect increased heat from the operator 102 when the smart helmet 200 is being worn, and decreased heat when the helmet is not worn. As another example, a simple mechanical switch sensor 204 (e.g., positioned in/on, and/or attached to, the suspension 232 of the smart helmet 200) may be actuated when the smart helmet 200 is being worn. As another example, a capacitive sensor 204 (e.g., positioned in/on, and/or attached to, the suspension 232 of the smart helmet 200) may detect contact from skin of an operator 102 when the smart helmet 200 is being worn, and no contact when the smart helmet 200 is not being worn.

As another example, an optical sensor 204 (e.g., an IR sensor 204) retained in the suspension 232 and/or helmet shell 230 may detect an optical signal (e.g., a light) emitted by a light 206 that is also retained in the suspension 232 and/or helmet shell 230 when the smart helmet 200 is not being worn. In such an example, the optical sensor 204 may be retained in a strap of the suspension 232 that wraps around the back of the head of an operator 102 when the smart helmet 200 is being worn, and the light 204 may be retained in a strap of the suspension that wraps around the crown or forehead (or vice versa). In such an example, the light 206 may be directed at the sensor 204 across a gap that would normally be filled by the head of an operator 102 when the smart helmet 200 is worn. Thus, the arc time tracking program 400 may conclude that the helmet is not being worn if the sensor 204 detects the optical signal, because the head of the operator 102 would have interrupted the optical signal if the smart helmet 200 was being worn.

In some examples, the sensor 204 and/or light 206 may be positioned differently, so long as the optical signal is sent across a space that would normally be filled by the head of the operator 102 when the smart helmet 200 is worn. In some examples, the light 206 and sensor 204 may be positioned at the same location (and/or in the same device) and a reflector may be retained in the suspension 232 and/or helmet shell 230 to reflect the optical signal back to the sensor 204 when not interrupted by the head of the operator 102.

As another example, the arc time tracking program 400 may verify that the smart welding helmet 200 is being worn down over the face of the operator 102, such as would occur during a welding operation. In some examples, the arc time tracking program 400 may consider output(s) of the sensor(s) 204 to determine whether the welding helmet 200 is being worn down over the face of the operator 102. For example, a potentiometer and/or encoder sensor 204 retained in/on the suspension 132 may be configured to detect different rotational positions of the helmet shell 230 with respect to the side attachment point(s) of the suspension 232, and output a voltage and/or electrical signal representative of the detected rotational position (e.g., raised or lowered). As another example, a reed switch sensor 204 retained in the middle strap of the suspension 132 may be actuated by a magnet (e.g., the lens device 250) of the smart helmet module 200 that comes within proximity of the reed switch sensor 204 when the smart helmet 200 is raised.

As another example, a mechanical switch sensor 204 retained in/on a rear strap of the suspension 132 may be actuated by the helmet shell 230 when the smart helmet 200 is in the raised position. As another example, a carbon dioxide sensor 204 may detect increased carbon dioxide levels, an airflow sensor 204 may detect increased airflow levels, and/or an oxygen sensor 204 may detect decreased oxygen levels (e.g., above/below a threshold) when the smart helmet 200 is being worn down over the face of the operator 102. As another example, two coordinated IMU sensors 204, one in the helmet shell 230 and the other in the suspension 232, may detect relative force vectors from which the arc time tracking program 400 can determine whether the smart helmet 200 is in the raised or lowered position.

As another example, an optical sensor 204 (e.g., an IR sensor 204) retained in/on one side of helmet shell 230 may detect an optical signal (e.g., a light) emitted by a light 206 that is retained in/on the other side of the helmet shell 230 when the smart helmet 200 is in the raised position. The light 206 may be directed at the sensor 204 (and/or the sensor 204 and light 206 may be positioned) such that the optical signal is emitted across a gap that would normally be filled by the head of an operator 102 when the smart helmet 200 is worn in the lowered position. For example, the light 206 and/or sensor 204 may be positioned on opposite sides of the lower helmet shell 230 at an approximate height of the chin and/or cheek of the operator 102 when the smart helmet 200 is worn in the lowered position (see, e.g., FIG. 2*b*). In some examples, the light 206 and sensor 204 may be positioned at the same location (and/or in the same device) and a reflector may be retained in/on the helmet shell 230 to reflect the optical signal back to the sensor 204 when not interrupted by the head of the operator 102. In such examples, the optical signal would be interrupted by the operator 102 when the smart helmet 200 is worn in the lowered position. However, when the smart helmet 200 is raised (e.g., as in FIG. 2*c*), the optical signal would no longer be blocked by the operator 102, and the sensor 206 would detect the signal. Thus, the arc time tracking program 400 may conclude that the helmet is being worn in the raised position if the sensor 204 detects the optical signal, because the head of the operator 102 would have interrupted the optical signal if the smart helmet 200 was being worn in the lowered position.

In some examples, the sensor 204 might also detect the optical signal if no operator is wearing the smart helmet 200 at all. However, such a situation may be avoided by first verifying that an operator 102 is wearing the smart helmet 200 (i.e., using a different method). Alternatively, this arrangement may be used to quickly verify that the smart helmet 200 is both being worn and being worn lowered down over the face of the operator 102, as the optical signal would be detected by the sensor 204 if either were not the case.

In the example of FIG. 4, the arc time tracking program 400 proceeds to block 408 after block 406. At block 408, the arc time tracking program 400 determines whether the necessary conditions have been met for arc time tracking to occur. In some examples, the arc time tracking program 400 may require one or more particular conditions be met (e.g., temp, current, or worn down over face), or at least one (or more) of any of the conditions be met. As shown, the arc time tracking program 400 returns to block 402 if a necessary condition was not met (though, in some examples, the arc time tracking program 400 may end instead).

In the example of FIG. 4, the arc time tracking program 400 proceeds to block 410 if all the necessary conditions were found to have been satisfied. In some examples, the arc time tracking program 400 may proceed to block 410 if a threshold number of the necessary conditions were found to have been satisfied. In some examples, the arc time tracking program 400 may proceed to block 410 if at least one of the necessary conditions were found to have been satisfied.

At block 410, the arc time tracking program 400 tracks arc time. In some examples, tracking arc time may mean increasing a count of (current and/or total) arc time. In some examples, tracking arc time may mean recording (e.g., in memory circuitry 302) the current count of arc time. In some examples, tracking arc time may mean recording (e.g., in memory circuitry 302) that a welding arc is present at the current date/time. In some examples, the processing circuitry 304 (and/or memory circuitry 302) may include a clock and/or counter that the arc time tracking program 400 uses to track arc time while blocks 406 and 408 remain satisfied. In some examples, the arc time tracking program 400 may store the count in memory circuitry 302 and/or associate timestamp information with the count (e.g., via the clock) so as to track how much arc time occurred during particular days and/or times.

In some examples, the arc time tracking program 400 may associate job information and/or a welding procedure specification (WPS) being used by the operator 102 (e.g., for the current job) with the recorded arc time. In some examples, the arc time tracking program 400 may communicate the recorded arc time (and/or associated information) to the remote server(s) 108 along with identification information (e.g., for the smart helmet 200 and/or operator). The remote server(s) 108 may use this information to keep track of the arc time for several different smart helmets 200, operators 102, jobs, etc. In some examples, the remote server(s) 108 may communicate statistical and/or comparison information regarding arc time to the smart helmet 200.

In some examples, the arc time tracking program 400 may additionally, or alternatively, activate and/or darken the ADF 220 at block 410. This may increase the reliability and/or speed with which the ADF 220 is activated. In such an example, the arc time tracking program 400 may analyze the light intensity (rather than the state of the ADF 220) at blocks 402 and/or 404. In some examples, the arc time tracking program 400 may skip blocks 402 and/or 404 entirely.

While shown as returning to block 402 after block 410, in some examples, block 410 may continue to track arc time (and/or activate the ADF 220) until the requirements of block 406 and/or block 408 are no longer satisfied. In some examples, the arc time tracking program 400 may end after block 410 instead of returning to block 402.

FIG. 5 is a flowchart illustrating operation of an example lens maintenance program 500. In some examples, the lens maintenance program 500 notifies an operator to clean and/or replace their cover lens when the cover lens becomes substantially occluded (e.g., due to weld spatter, scratches, etc.) and/or has been in use for a certain amount of time (and/or arc time). This may assist operators who become too engrossed in their work to notice the gradually diminishing visibility. While described in terms of the cover lens 202 for simplicity and convenience, in some examples, the lens maintenance program 500 may be equally applicable to one or more lenses of one or more camera/optical sensors 204.

In the example of FIG. 5, the lens maintenance program 500 begins at block 502. At block 502, the lens maintenance program 500 detects the presence (or absence) of the cover lens 202 using means previously described. As shown, the lens maintenance program 500 proceeds to block 504 after block 502, where the lens maintenance program 500 branches depending on whether the cover lens 202 was detected at block 502.

In the example of FIG. 5, the lens maintenance program 500 proceeds to block 506 after block 504 if the cover lens 202 was not detected. At block 506, the lens maintenance program 500 concludes that the cover lens 202 was removed for maintenance and/or replacement, and so resets a counter (e.g., of the processing circuitry 304 and/or memory circuitry 302) that is used to keep track of an amount of time since the cover lens 202 was last replaced or underwent maintenance.

In some examples, multiple counters may be used, such as, for example, one counter to keep track of an amount of time since the cover lens 202 was last replaced and another counter to keep track of an amount of time since the cover lens 202 last underwent maintenance. In some examples with multiple counters, only one counter may be reset. In some examples, that one counter may be the replacement counter. In some examples, user input may identify the appropriate counter. In some examples, the value of the counter may be saved in memory circuitry 302 prior to being reset.

In some examples, the lens maintenance program 500 may additionally, or alternatively, provide an output and/or other notification (e.g., via the control inputs/outputs 208) indicating that the cover lens 202 is absent at block 506. This may help to inform an (e.g., unwary) operator 102 that their cover lens 202 is not present, in case the operator 102 has not noticed and/or the cover lens 202 was accidentally removed. In some examples, the lens maintenance program 500 may send a disable signal (e.g., via communication circuitry 306) to the welding equipment 106 and/or welding torch 114, so that no welding occurs while the cover lens 202 is absent. As shown, the lens maintenance program 500 ends after block 506 (though, in some examples, the lens maintenance program 500 may instead return to block 502).

In the example of FIG. 5, the lens maintenance program 500 proceeds to block 508 after block 504 if the cover lens 202 was not detected. At block 508, the lens maintenance program 500 increases the count of the counter(s), if appropriate. In some examples, the lens maintenance program 500 may simply count time. However, in some examples, the lens maintenance program 500 may count arc time instead of normal temporal time. In such an example, the lens maintenance program 500 may execute the arc time tracking program 400 at block 508 (or some appropriately modified version), and only increase the count(s) if block 410 of the arc time tracking program 400 executes per the conditions of blocks 406 and 408. In some examples, the lens maintenance program 500 may send an enable signal (e.g., via communication circuitry 306) to the welding equipment 106 and/or welding torch 114 at block 508, to allow welding to occur (in case welding was previously disabled at block 506).

In the example of FIG. 5, the lens maintenance program 500 proceeds to block 510 after block 508. At block 510, the lens maintenance program 500 determines whether the count that was increased at block 508 exceeds a count threshold (e.g., stored in memory circuitry 302 and/or set via control inputs/outputs 208). In some examples, the count threshold may be indicative of a predetermined, user input, and/or statistically determined maintenance and/or replacement schedule. In some examples, the count threshold may be set automatically according to the most recently recorded count prior to reset at block 506 (and/or 520). In some examples, the statistically determined schedule may be automatically determined based on an average (and/or other statistical calculation) of the most recently recorded counts prior to reset at block 506 (and/or 520). In some examples, the count threshold may be received from an outside source (e.g., the remote server(s) 108), which may determine the statistically determined schedule based on statistical analysis of many recorded counts of many different smart helmets 200.

In the example of FIG. 5, the lens maintenance program 500 proceeds to block 512 after block 510 if the count(s) exceed the threshold(s). At block 512, the lens maintenance program 500 outputs one or more signals representative of the need for maintenance and/or replacement (as appropriate) of the cover lens 202. In some examples, the signal(s) may be output to the UI circuitry 308, which may translate the signal(s) into user perceivable notification provided via the control inputs/outputs 208. In some examples, the signal(s) may be output to the communication circuitry 306, which may send the signal(s) (and/or other signal(s)) to the welding equipment 106. The welding equipment 106, in turn, may translate the signal(s) into user perceivable notification provided via an operator interface of the welding equipment 106. In some examples, the communication circuitry 306 may send the signal(s) (and/or other signal(s)) to the remote server(s) 108, which may translate the signal(s) into user perceivable notifications provided to various devices over a connected network. While shown as ending after block 512, in some examples, the lens maintenance program 500 may instead return to block 502.

In the example of FIG. 5, the lens maintenance program 500 proceeds to block 514 after block 510 if the count(s) do not exceed the threshold(s). At block 514, the lens maintenance program 500 detects an occlusion amount of the cover lens 202, such as, for example, via the means discussed above. As shown, the lens maintenance program 500 then proceeds to block 516 where the lens maintenance program 500 determines whether the detected occlusion amount is greater than a $1^{st}$ threshold occlusion amount (e.g., stored in memory circuitry 302 and/or set via control inputs/outputs 208). In some examples, the $1^{st}$ threshold occlusion amount may be an occlusion amount above which visibility through the cover lens 202 would be substantially inhibited. If the lens maintenance program 500 determines that the detected occlusion amount is greater than the $1^{st}$ threshold occlusion amount, then the lens maintenance program 500 proceeds to block 512 after block 516.

In the example of FIG. 5, the lens maintenance program 500 proceeds to block 518 after block 516 if the lens maintenance program 500 determines that the detected occlusion amount is not greater than the $1^{st}$ threshold occlusion amount. At block 518, the lens maintenance program 500 determines whether the detected occlusion amount is less than a $2^{nd}$ threshold occlusion amount (e.g., stored in memory circuitry 302 and/or set via control inputs/outputs 208). In some examples, the $2^{nd}$ threshold occlusion amount may be an occlusion amount below which may be indicative of a new and/or recently cleaned cover lens 202. If the lens maintenance program 500 determines that the detected occlusion amount is not less than the $2^{nd}$ threshold occlusion amount, then the lens maintenance program 500 ends after block 518 (though, in some examples, the lens maintenance program 500 may instead return to block 502).

In the example of FIG. 5, the lens maintenance program 500 proceeds to block 520 after block 518 if the lens maintenance program 500 determines that the detected occlusion amount is less than the $2^{nd}$ threshold occlusion amount. At block 520, the lens maintenance program 500 resets the counter(s), similar (or identical) to block 506. In some examples, where different counters are used for maintenance and replacement, only the maintenance counter may be reset (or the counter(s) identified by user input). In some examples, the value of the counter may be saved in memory circuitry 302 prior to being reset. As shown, the lens maintenance program 500 ends after block 520 (though, in some examples, the lens maintenance program 500 may instead return to block 502).

While the example lens maintenance program 500 depicted in FIG. 5 includes two different paths to block 512, in some examples, the lens maintenance program 500 may only include one of these paths. For example, blocks 502-510 may be omitted in examples where the lens maintenance program 500 only considers occlusion. In such an examples, the lens maintenance program would start at block 514 rather than block 502. In an alternative example, blocks 514-520 may be omitted in examples where the lens maintenance program 500 only considers the presence or absence of the cover lens 202. In such an example, the lens maintenance program 500 may end (or return to block 502) instead of proceeding to block 514 after block 510.

The smart welding helmets 200 described herein provide smart functionality to aid a welding operator 102. In particular, the smart welding helmets 200 provide an arc time tracking program 400 that checks whether certain conditions are satisfied before tracking the arc on time. This may make arc time tracking more reliable by preventing tracking during certain false positive arc detection scenarios. Additionally, the smart welding helmets 200 provide a lens maintenance program 500 that notifies an operator to clean and/or replace their cover lens 202 when the cover lens 202 becomes substantially occluded (e.g., due to weld spatter and/or scratches) and/or has been in use for a certain amount of time (and/or arc time). This may assist operators who become too engrossed in their work to notice the gradual diminishment in visibility.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, disable may mean deactivate, incapacitate, and/or make inoperative. As used herein, enable may mean activate and/or make operational.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A welding helmet, comprising:
   processing circuitry; and
   memory circuitry comprising machine readable instructions which, when executed, cause the processing circuitry to:
   determine whether an operator is performing a welding operation based on a distance from the welding helmet to a light source, and
   track an arc time or darken a filter of the welding helmet in response to determining that the operator is performing the welding operation,
   wherein determining whether the operator is performing the welding operation based on the distance from the welding helmet to the light source comprises:
   capturing a first image and a second image of the light source via a first image sensor and a second image sensor of the welding helmet,
   determining a distance between the welding helmet and the light source using the first image and the second image,
   determining whether the distance is less than a threshold distance, and
   determining that the operator is performing the welding operation in response to determining that the distance is less than the threshold distance.

2. The welding helmet of claim 1, further comprising a helmet shell.

3. The welding helmet of claim 1, wherein the memory circuitry further comprises machine readable instructions which, when executed, cause the processing circuitry to: track the arc time while the filter of the welding helmet is darkened in response to determining that the operator is performing the welding operation.

4. The welding helmet of claim 1, further comprising the first image sensor.

5. The welding helmet of claim 4, further comprising the second image sensor.

6. The welding helmet of claim 1, wherein the memory circuitry comprises machine readable instructions which, when executed, cause the processing circuitry to track the arc time in response to determining that the operator is performing the welding operation.

7. The welding helmet of claim 1, wherein the memory circuitry comprises machine readable instructions which, when executed, cause the processing circuitry to determine whether the operator is performing the welding operation based on the distance from the welding helmet to the light source and whether the welding helmet is mounted on a head of an operator, wherein determining whether the operator is performing the welding operation based on the distance from the welding helmet to the light source and whether the welding helmet is mounted on a head of an operator comprises:
   determining whether a capacitive sensor of the welding helmet detects skin contact, determining whether a carbon dioxide sensor of the welding helmet detects a carbon dioxide level above a CO2 threshold, determining whether an oxygen sensor of the welding helmet detects an oxygen level below an oxygen threshold, or determining whether an optical sensor detects an optical signal transmitted across a space that would be filled by the head of the operator if the welding helmet was mounted on the head of the operator, and
   determining that the operator is performing the welding operation in response to determining that the distance from the welding helmet to the light source is less than the threshold distance and the capacitive sensor detects skin contact, the carbon dioxide sensor detects the carbon dioxide level above the CO2 threshold, the oxygen sensor detects the oxygen level below the oxygen threshold, or the optical sensor does not detect the optical signal.

8. The welding helmet of claim 1, wherein the memory circuitry comprises machine readable instructions which, when executed, cause the processing circuitry to determine whether the operator is performing the welding operation based on the distance from the welding helmet to the light source and whether the welding helmet is in an up or down orientation over a face of the operator, wherein determining whether the operator is performing the welding operation based on the distance from the welding helmet to the light source and whether the welding helmet is in an up or down orientation over a face of the operator comprises:
   determining whether a carbon dioxide sensor of the welding helmet detects a carbon dioxide level above a CO2 threshold, determining whether an oxygen sensor of the welding helmet detects an oxygen level below an oxygen threshold, or determining whether an optical sensor detects an optical signal transmitted across a space that would be filled by the head of the operator if the welding helmet was in a down orientation, and
   determining that the operator is performing the welding operation in response to determining that the distance from the welding helmet to the light source is less than the threshold distance and the carbon dioxide level is above the CO2 threshold, the oxygen level is below the oxygen threshold, the potentiometer or encoder sensor indicates the welding helmet is in the down orientation, the first and second force vectors of the first and second accelerometers indicate that the welding helmet is in the down orientation, or the optical sensor does not detect the optical signal.

9. The welding helmet of claim 1, wherein the distance between the welding helmet and the light source is determined using a triangulation, trilateration, or stereoscopic ranging technique.

10. The welding helmet of claim 1, wherein the memory circuitry further comprises machine readable instructions which, when executed, cause the processing circuitry to:
    track the arc time in response to determining that the operator is performing the welding operation, and
    associate the arc time with a welding procedure specification (WPS) being used by the operator.

11. A welding helmet, comprising:
processing circuitry; and
memory circuitry comprising machine readable instructions which, when executed, cause the processing circuitry to:
  determine whether an operator is performing a welding operation based on at least one of a welding signal, a measured wire feed speed, a measured gas flow rate, a distance from the welding helmet to a light source, whether the welding helmet is mounted on a head of the operator, or whether the welding helmet is in an up or down orientation over a face of the operator, and
  track an arc time or darken a filter of the welding helmet in response to determining that the operator is performing the welding operation,
  wherein determining whether the operator is performing the welding operation based on the welding signal comprises:
    receiving the welding signal from a welding power supply, a wire feeder, a gas valve, or a welding tool,
  wherein determining whether the operator is performing the welding operation based on the measured wire feed speed or the measured gas flow rate comprises:
    receiving a wire feed speed measurement or a gas flow rate measurement from the welding power supply, the wire feeder, the gas valve, or the welding tool,
  wherein determining whether the operator is performing the welding operation based on whether the welding helmet is mounted on a head of an operator comprises:
    determining whether a capacitive sensor of the welding helmet detects skin contact, determining whether a carbon dioxide sensor of the welding helmet detects a carbon dioxide level above a CO2 threshold, determining whether an oxygen sensor of the welding helmet detects an oxygen level below an oxygen threshold, or determining whether an optical sensor detects an optical signal transmitted across a space that would be filled by the head of the operator if the welding helmet was mounted on the head of the operator, and
    determining that the operator is performing the welding operation in response to determining that the capacitive sensor detects skin contact, the carbon dioxide sensor detects the carbon dioxide level above the CO2 threshold, the oxygen sensor detects the oxygen level below the oxygen threshold, or the optical sensor does not detect the optical signal, and
  wherein determining whether the operator is performing the welding operation based on whether the welding helmet is in an up or down orientation over a face of the operator comprises:
    determining whether a carbon dioxide sensor of the welding helmet detects a carbon dioxide level above a CO2 threshold, determining whether an oxygen sensor of the welding helmet detects an oxygen level below an oxygen threshold, or determining whether an optical sensor detects an optical signal transmitted across a space that would be filled by the head of the operator if the welding helmet was in a down orientation, and
    determining that the operator is performing the welding operation in response to determining that the carbon dioxide level is above the CO2 threshold, the oxygen level is below the oxygen threshold, or the optical sensor does not detect the optical signal.

12. The welding helmet of claim 11, wherein the memory circuitry comprises machine readable instructions which, when executed, cause the processing circuitry to determine whether the operator is performing the welding operation based on the measured wire feed speed or the measured gas flow rate, wherein determining whether the operator is performing the welding operation based on the measured wire feed speed or the measured gas flow rate further comprises:
  determining whether the wire feed speed measurement or the gas flow rate measurement is above a threshold, and
  determining that the operator is performing the welding operation in response to determining that the wire feed speed measurement or the gas flow rate measurement is above the threshold.

13. The welding helmet of claim 11, wherein the memory circuitry further comprises machine readable instructions which, when executed, cause the processing circuitry to: track the arc time while the filter of the welding helmet is darkened in response to determining that the operator is performing the welding operation.

14. The welding helmet of claim 11, wherein the memory circuitry comprises machine readable instructions which, when executed, cause the processing circuitry to determine whether the operator is performing the welding operation based on the welding signal.

15. The welding helmet of claim 14, where determining whether the operator is performing the welding operation based on the welding signal comprises determining whether the welding signal is indicative of a welding operation.

16. The welding helmet of claim 11, wherein the memory circuitry further comprises machine readable instructions which, when executed, cause the processing circuitry to track the arc time in response to determining that the operator is performing the welding operation.

17. The welding helmet of claim 11, wherein the memory circuitry comprises machine readable instructions which, when executed, cause the processing circuitry to determine whether the operator is performing the welding operation based on whether the welding helmet is mounted on a head of an operator.

18. The welding helmet of claim 11, wherein the memory circuitry comprises machine readable instructions which, when executed, cause the processing circuitry to determine whether the operator is performing the welding operation based on whether the welding helmet is in the up or down orientation over the face of the operator.

19. The welding helmet of claim 11, wherein the memory circuitry comprises machine readable instructions which, when executed, cause the processing circuitry to determine whether the operator is performing the welding operation based on the distance from the welding helmet to the light source, wherein determining whether the operator is performing the welding operation based on the distance from the welding helmet to the light source comprises:
  capturing a first image and a second image of the light source via a first image sensor and a second image sensor of the welding helmet,
  determining a distance between the welding helmet and the light source using the first image and the second image, determining whether the distance is less than a threshold distance, and determining that the operator is performing the welding operation in response to determining that the distance is less than the threshold distance.

20. The welding helmet of claim 11, wherein the memory circuitry further comprises machine readable instructions which, when executed, cause the processing circuitry to:

track the arc time in response to determining that the operator is performing the welding operation, and associate the arc time with a welding procedure specification (WPS) being used by the operator.

* * * * *